(No Model.)
H. F. GANON.
WHEEL GUARD FOR VEHICLES.
No. 458,159. Patented Aug. 25, 1891.
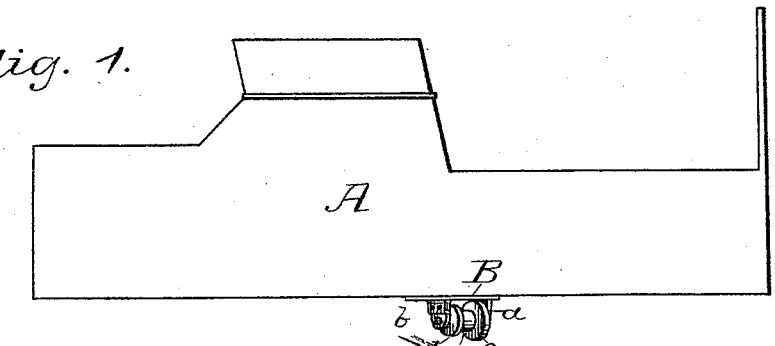
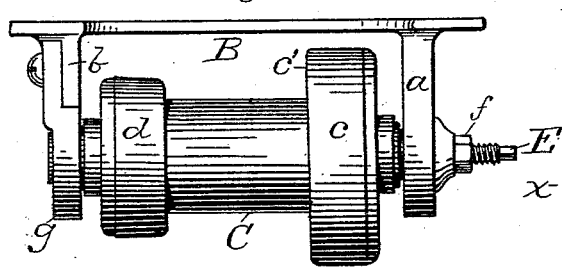
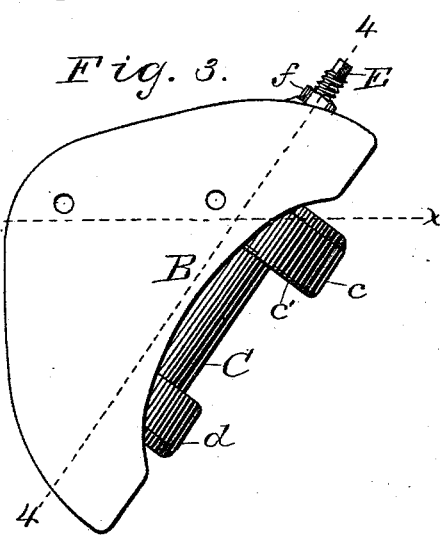
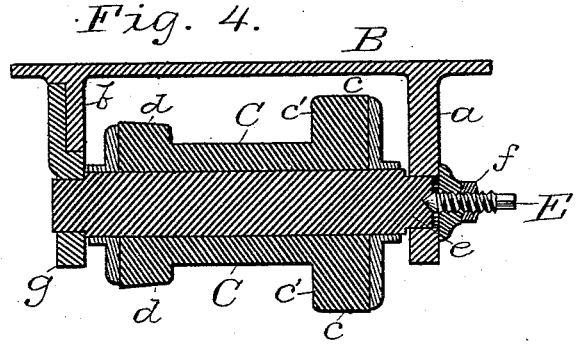
Witnesses
Chas. H. Evans
Robert R. Pryor
Henry Fairborn Ganon
Inventor
By his Attorney
Frank W. Thomason

UNITED STATES PATENT OFFICE.

HENRY FAIRBORN GANON, OF PEORIA, ILLINOIS.

WHEEL-GUARD FOR VEHICLES.

SPECIFICATION forming part of Letters Patent No. 458,159, dated August 25, 1891.

Application filed July 7, 1890. Serial No. 357,960½. (No model.)

*To all whom it may concern:*

Be it known that I, HENRY FAIRBORN GANON, of Peoria, in the county of Peoria and State of Illinois, have invented certain new and useful Improvements in Wheel-Guards for Vehicles, of which the following is a full, clear, and exact description, reference being had to the accompanying drawings, and to the letters of reference marked thereon.

The object of my invention is to provide an anti-friction-bearing revolving guard for the sides of the bodies of four-wheeled vehicles, so that when turning a curve the fore wheels, instead of grinding into the sides of the body or into the guard-plate now extensively used for the purpose of protecting the same and making a very disagreeable noise, simply impinges against the rubber circumference of my improved guard, which is so constructed as to confine and prevent the lateral movement of the wheel and noiselessly revolves the same without being able to pass under, substantially as hereinafter fully described, and as illustrated in the drawings, in which—

Figure 1 is a side elevation of a buggy-body, showing my invention applied thereto. Fig. 2 is a side elevation of my invention, shown separately. Fig. 3 is a plan view thereof, and Fig. 4 is a vertical section therethrough, taken on dotted lines 4 4, Fig. 3.

Referring to the drawings, A represents a buggy-body, and B represents a plate of a shape substantially like that shown in Fig. 3 of the drawings, which is secured in a suitable manner to the under side of said body, so that the side edge of the latter comes about on the plane indicated by dotted line $x$ $x$, Fig. 3. Securing the plate in this way leaves part of it projecting beyond the side of the body, so that, if desired, it can be used as a step, and it also places the roller C in such position that when the fore wheels of a vehicle are turned sufficiently the wheel on the side toward which the turn was made would strike said roller at right angles to the plane of its revolution.

Depending downward from the plate B are lugs $a$ and $b$, in and between which roller C is journaled, and such are the respective locations of these lugs that the center of revolution of said roller is at right angles to the line of travel of the wheel when the fore wheels are turned so that said wheel strikes against it.

Roller C is of a length corresponding to about the distance between the lugs $a$ and $b$, (say five or six inches,) and it is provided with a circumferential flange $c$ at its inner end, so as to provide a shoulder $c'$, and is also provided with a flange $d$ at the other end, which does not project, preferably, quite so so far as the flange $c$. The purpose of the flange $c$ is to present a shoulder against which the tire of the wheel, after it has come in contact with the roller, will strike when it is strained laterally in that direction by reason of the vehicle making a forward turn. The weight of the body of the vehicle on that part of the wheel which strikes the guard when it is taking a short forward turn is what causes said wheel to move laterally, and it is to confine the wheel so that it cannot work off of said roller that I make the flange. The flange $d$ at the other end of the roller is for the same purpose as flange $c$; but it only comes into use to prevent the wheel working off of the roller in that direction when the vehicle is being backed on a short curve. These two flanges I consider as one of the essential features of my invention, and especially flange $c$, which it would be impossible to dispense with.

When the wheel bears against shoulder $c'$ of flange $c$, it naturally pushes the roller toward and against lug $a$, and unless some means to obviate this were provided it would bind the same so that it would be difficult if not impossible for the roller to revolve. I therefore make, concentrically, in the end of a contiguous journal $e$ of said roller a tapered countersunk recess, and drive into it the tapered end of the gage-screw E, which is tapped laterally through the lugs $a$ in alignment with the center of revolution of the roller. Thus a comparatively frictionless journal is obtained, which as it wears away can be adjusted by manipulating screw E. This screw or bolt E may be locked to prevent the possibility of its independently working outward by means of a nut $f$, as shown.

My invention would be lacking a very desirable feature were it impossible for me to remove the roller when it or the rubber facing which I prefer to give it was worn out. I therefore make lug b in two parts—viz., the lug proper or upper part and the extension g, which is lapped against and bolted or otherwise secured to the lug proper. The extension g has the bearing in it for the adjacent roller of the journal. Consequently when it is detached the roller can be removed longitudinally from its bearing in lug a and a new roller easily substituted therefor.

Both the gage-screw and the removable extension of lug b may be dispensed with, although, for the reasons alluded to, I much prefer their use.

What I claim as new is—

1. The combination, with screw-plate B, secured to the under side of the body of the vehicle and having the downwardly-depending lugs a and b, said lug a having bearings in its end, and said lug b having an extension g removably secured thereto having similar bearing, and said extension, of a cylindrical roller journaled in the bearings of said lug a and extension g and having circumferential flanges c and d located at its inner and outer end, respectively, flange c being greater in diameter than flange d, as set forth.

2. The plate B, lug a, projecting downward therefrom, having bearings in its end, the outer opening of which is closed in a suitable manner, gage-screw E, tapped transversely into the center of said bearings, so as to center the journal of the cylindrical roller C, journaled therein, lug b, also depending from plate B, and removable extension therefor, having a bearing in it similar to and in alignment with that in lug a, in combination with a cylindrical roller having circumferential flanges c and d at its inner and outer ends, respectively, the flange c on the outer end contiguous to lug a being greater in diameter than the flange d on the other end of said roller, as set forth.

HENRY FAIRBORN GANON.

Witnesses:
JOSEPH A. WEIT,
M. C. QUINN.